United States Patent
Visagie et al.

(10) Patent No.: US 6,780,102 B2
(45) Date of Patent: Aug. 24, 2004

(54) TRANSFER MECHANISM FOR FEEDING HARVESTED CROP TO A SEPARATION UNIT

(75) Inventors: Andrie Visagie, Bothaville (ZA); Thomas Barrelmeyer, Versmold (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/102,039

(22) Filed: Mar. 19, 2002

(65) Prior Publication Data

US 2002/0155867 A1 Oct. 24, 2002

(30) Foreign Application Priority Data

Mar. 19, 2001 (GB) .............................. 0106725

(51) Int. Cl.$^7$ .............................................. A01F 12/10
(52) U.S. Cl. .......................................... 460/70; 460/46
(58) Field of Search .............................. 460/16, 17, 20, 460/45, 46, 59, 65, 66, 70, 79, 80, 81, 84, 119

(56) References Cited

U.S. PATENT DOCUMENTS

| | | | | |
|---|---|---|---|---|
| 3,464,419 A | * | 9/1969 | Knapp et al. | 460/68 |
| 3,556,108 A | * | 1/1971 | Knapp et al. | 460/97 |
| 3,586,004 A | * | 6/1971 | De Pauw et al. | 460/68 |
| 3,943,939 A | * | 3/1976 | Rowland-Hill | 460/70 |
| 4,209,024 A | * | 6/1980 | Powell et al. | 460/70 |
| 4,291,709 A | * | 9/1981 | Weber et al. | 460/70 |
| 5,344,367 A | * | 9/1994 | Gerber | 460/68 |
| 5,387,153 A | * | 2/1995 | Tanis | 460/68 |
| 5,454,758 A | * | 10/1995 | Tophinke et al. | 460/68 |
| 5,556,337 A | * | 9/1996 | Tophinke et al. | 460/70 |
| 5,733,192 A | * | 3/1998 | Jones | 460/113 |
| 5,772,503 A | * | 6/1998 | Janzen et al. | 460/70 |
| 6,129,629 A | * | 10/2000 | Dammann et al. | 460/67 |
| 6,213,870 B1 | * | 4/2001 | Satzler | 460/6 |
| 6,241,605 B1 | * | 6/2001 | Pfeiffer et al. | 460/69 |
| 6,352,474 B1 | * | 3/2002 | Payne et al. | 460/66 |

FOREIGN PATENT DOCUMENTS

| | | |
|---|---|---|
| DE | 216 846 | 1/1985 |
| WO | WO 97/29628 | 8/1997 |

* cited by examiner

Primary Examiner—Thomas B. Will
Assistant Examiner—Nathan S Mammen
(74) Attorney, Agent, or Firm—Husch & Eppenberger, LLC; Robert E. Muir; Robert C. Haldiman

(57) ABSTRACT

A combine harvester is provided with a feeder housing; A separation unit including a rotor driven by a shaft is arranged in a rotor housing. The separation unit a feed end and a discharge end; and a transfer mechanism located in the region of the intersection of the feeder housing and the feed end of the separation unit; The transfer mechanism includes a plurality of auger blades connected with the rotor in the region of the feed zone; A rotating element located in the feeder housing has an axis of rotation perpendicular to the axis of the rotor and above the feed end of the rotor. The rotating element feeds harvested crops to the separation unit from underneath the rotating element's axis of rotation. A transition housing connecting the feeder housing and the rotor housing has a plurality of interior edges forming a feeding opening through the transition housing wherein the interior edge of the transition housing that forms the bottom of the feeding opening is longer than the interior edge that forms the top of the feeding opening. The transition housing projects up to the width of the feeder housing and has a concave bend to accommodate the circumference of the rotating element.

26 Claims, 3 Drawing Sheets

TRANSFER MECHANISM FOR FEEDING HARVESTED CROP TO A SEPARATION UNIT

TECHNICAL FIELD OF THE INVENTION

The present invention relates generally to agricultural machinery and, more particularly, to an arrangement for enhanced transfer of harvested crop from a feeder housing to a separation unit in a combine harvester.

BACKGROUND OF THE INVENTION

U.S. Pat. No. 3,464,419 describes an axial flow type combine harvester having a feeder housing in its front end that distributes harvested crops from the front end of the combine to a separation unit. The separation unit includes a rotary driven separation rotor arranged in a rotor housing and has a feed end and a discharge end. The area where the harvested crops are fed from the feeder housing into the rotor housing is referred to as a feeding zone. The separation unit also includes a separation zone in which a sieve device is located in the rotor housing. The area at the discharge end of the rotor housing is referred to as a discharge zone.

According to the disclosure of the '419 patent, the harvested material is fed into the rotor housing from a position above the shaft of the separation rotor. To ease the flow of harvested good into the rotor housing, a contoured cowling forming a throat and having a bottom surface above the shaft of the separation rotor is provided. However, this design results in undesirable feeding characteristics. Therefore, the axial flow type combines introduced into the market later utilized a feeding system in which harvested crops were distributed into the separation unit from the front of the rotor housing or from underneath the rotor housing.

German patent DD 216 846 illustrates this type of feeding system in an axial flow type combine. An infeed plate is arranged at the bottom of the front end of the rotor housing to transfer harvested good from the feeder house into the axial rotor housing. This results in the harvested crops being distributed into the rotor housing in the bottom section of the cross section through the rotor housing. The described infeed plate is intended to ease the transfer of crops into the rotor housing through the use of a variety of different sections. A conical section on one side of the infeed plate curls crops into the bottom of the rotor housing. A ramp is located on the other side of the rotor housing to lift harvested material up and feeds it into the rotor from a higher position. A long-stretching triangular bottom plate in the middle of the infeed plate distributes crops into the rotor.

PCT/US97/02432 discloses a new concept for separating the kernel fraction from the straw and chaff fractions of the harvested good in which harvested material is conveyed into the rotor housing from above. However, this disclosure provides no details as to how this should work properly under all harvesting conditions.

The present invention is directed to overcoming one or more of the problems set forth above.

SUMMARY OF THE INVENTION

An aspect of the present invention is to provide an arrangement that enhances the transfer of harvested crops from a feeder housing to a separation unit in a combine harvester.

Another aspect of the present invention is to provide an arrangement for transferring harvested crops from a feeder housing to separation unit in a combine harvester by feeding the crops into the separation unit from a position above the separation unit's rotor shaft.

In accordance with the above aspects of the invention, there is provided a combine harvester having a feeder housing; a separation unit including a rotor driven by a shaft and arranged in a rotor housing, said separation unit having a feed end and a discharge end; and a transfer mechanism located in the region of the intersection of the feeder housing and the feed end of the separation unit, the transfer mechanism including a plurality of auger blades connected with the rotor in the region of the feeding zone; a rotating element located in the feeder housing and having an axis of rotation perpendicular to the axis of the rotor and above the feed end of the rotor, wherein the rotating element feeds harvested crops to the separation unit from underneath the rotating element's axis of rotation; and a transition housing connecting the feeder housing and the rotor housing and having a plurality of interior edges forming a feeding opening through the transition housing wherein the interior edge of the transition housing that forms the bottom of the feeding opening is longer than the interior edge that forms the top of the feeding opening, and wherein said transition housing projects up to the width of the feeder housing and has a concave bend to accommodate the circumference of the rotating element.

In another embodiment of the invention, the interior edge of the transition housing forming the bottom of the feeding opening is provided with a plurality of floors, each floor being at a different height.

These aspects are merely illustrative aspects of innumerable aspects associated with present invention and should not be deemed as limiting in any manner. These and other aspects, features and advantages of the present invention will become apparent form the following detailed description when taken in conjunction with referenced drawings.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
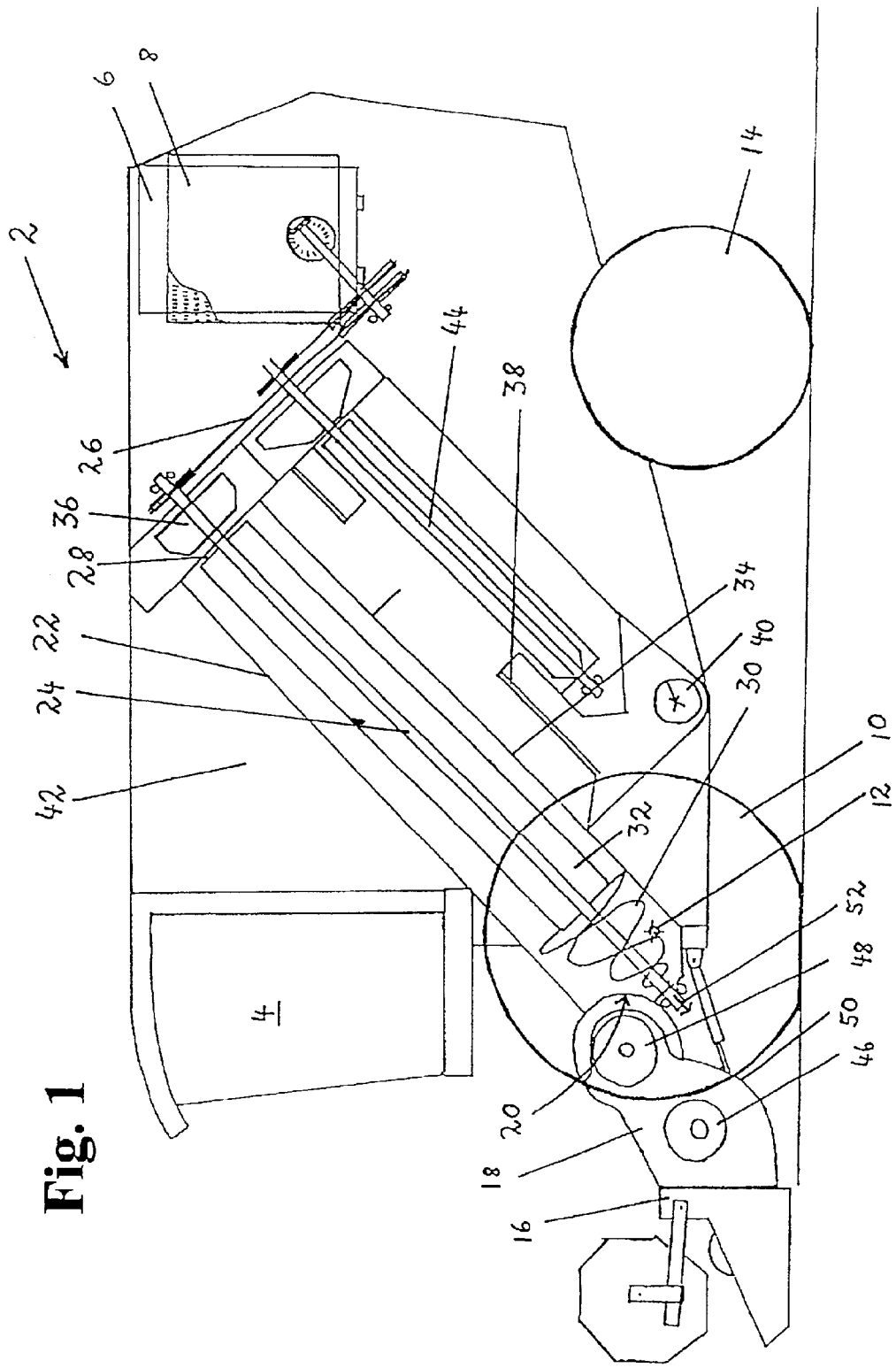
FIG. 1 is a schematic side view of a combine harvester incorporating an embodiment of the present invention.

FIG. 1 illustrates a combine harvester 2 having a cabin 4, an engine 6 with a cooling system 8, a front wheel 10 with a rotational axis 12, a rear wheel 14, and a feeder housing 8. The front end 16 of the combine 2 is shown in FIG. 1 as a cutterbar but could also be any other suitable equipment, such as corn headers or pick-ups.

The combine 2 includes a separation unit having a separation rotor 24 arranged within a rotor housing 22. The feeder housing 18 distributes harvested material from the front end 16 into the rotor housing 22 through a feeding opening 20 in a transition housing 80 (shown in FIG. 3). The separation rotor 24 is rotatably driven by driving elements 26 (shown in FIG. 1 as pulley drives) from the power of the engine 6. The front section, or feed end, of the separation rotor 24 is provided with a plurality of auger blades 30, which generally define the length of a feeding zone where harvested material is fed into the rotor housing 22. The middle and rearward sections of the separation rotor 24 are equipped with beater plates 32. Auger blades and beater plates are used herein as examples of tools that may be used for feeding harvested material into the rotor housing and threshing and separating the harvested material.

A separation zone is located in the rotor housing 22 approximately in the area of the beater plates 32. The bottom of the rotor housing in the separation zone is provided with sieve means 34, through which grain kernels and chaff may exit the rotor housing 22. A blower unit 36 creates an air stream toward a discharge zone 28 of the separation unit and out of the rotor housing 22 and the combine 2. The blower unit 36 can be driven by the same apparatus that drives the separation rotor 24. Grain kernels that exit the rotor housing 22 through the openings of sieve means 34 fall at least partially on a grain collecting element 38. The grain collecting element 38 guides the grain kernels by gravitational forces towards the grain collecting auger 40. The grain collecting auger 40 distributes the collected grain into a grain conveyor (not shown), which feeds the grain into a grain tank 42. The air stream generated by the blower unit 36 moves through the intermediate space between the sieve means 34 and the grain collecting element 38.

The above description refers to a single separation unit. However, two separation units as described may be arranged side by side in a combine harvester, and additional separation units may replace the sieve means.

The inclined arrangement of the separation unit at an angle of more than 30° relative to the horizontal plane provides many advantages. First, it reduces the travel speed of the harvested material within the rotor housing 22, which results in the crops rotating inside of the rotor housing 22 along a longer travelling path, thereby providing more opportunities for separating grain kernels. The heavier portions of the harvested material, like grain kernels, tend to move slower through the rotor housing 22, which brings some separation effect upon them in relation to the lighter fractions of the harvested material like straw or chaff. Another advantage is that the grain can be collected by simple grain collecting elements 38, which may be formed in the shape of a chute, and transported towards the collecting auger without any further driven elements. Also, when using a second separation unit as a cleaning apparatus for the grain and chaff that exit the rotor housing 22, the inclined arrangement of the rotor housing 22 advantageously results in the air stream generated by the blower unit 36 being unable to draw the grain kernels upwardly very easily due to their weight, so that they tend to fall either onto the grain collecting element 38 or into the second grain exit towards the second separation rotor 44. Finally, operation of the second separation rotor 44 can be combined with a second blower unit 54, which generates an air stream comparable to the air stream generated by the blower unit 36.

The feeder housing 18 contains at least two rotating elements, a front rotating element 46 and a rear rotating element 48. The floor 50 of the feeder housing 18 is partially adapted to the circumference of the rotating elements 46, 48. The feeding housing 18 houses the rear rotating element 48 in a cylindrical area (identified by arrow 20). In particular, the rear rotating element's discharge end is located in this area. The feeding opening of the rotor housing 22 is also located in this region. The cylindrical shape of the feeder housing 18 is perpendicular to and intrudes into the upper half of the cylindrical shape of the rotor housing 22. In a preferred embodiment, the rotating element 48 is accommodated in the rear portion of the feeder house 18, and the rotational axis of the rotating element 48 is coaxial with the rotation axis of the feeder house 18. In such an arrangement it is sufficient to use only two rotating elements 46, 48 to transport harvested material from the front end 16 of the combine 2 to the rotor housing 22.

When the rotor housing 22 is arranged in the combine harvester 2 as described, it is possible to position the engine 6 behind the rear end of the rotor housing 22 in the top rear half portion of the combine harvester 2. This minimizes the distance over which the power of the engine 6 must be transmitted to reach the separation rotor 24, saving cost and weight. This arrangement also prevents the cooling system from drawing in too much chaff, which is drawn into the vicinity of the engine by the blower units 36, 54. The shaft of the separation rotors 24, 44 can be used to transmit power from the engine 6 to the front end attachment 16, the rotating elements 46, 48, or other working components. This transfer of power is represented by arrow 52. This eliminates the need for additional drive train elements and limits the width of the combine 2. The shaft of the separation rotors 24, 44 may be equipped with toothed wheels to transfer its rotational drive to subordinated shafts, hydraulic pumps, electric generators, gearboxes or the like.

A grain tank 42 may be positioned in the area defined by the upper half of the rotor housing 22, the rear wall of the cabin 4, and the top margin of the combine harvester 2. In an embodiment with only one separation rotor 24 contained in the rotor housing 22 (two in a side-by-side arrangement are possible), a saddle-type grain tank 42 can extend around the sides of rotor housing 22.

It is advantageous to avoid using a rigid front axle or a machine frame beam in the region of the front wheel in order to leave sufficient space to position the front end of rotor housing 22 as low as possible. Small hydraulic or electric motors placed next to each wheel can be used to drive each wheel.

Figure 2:
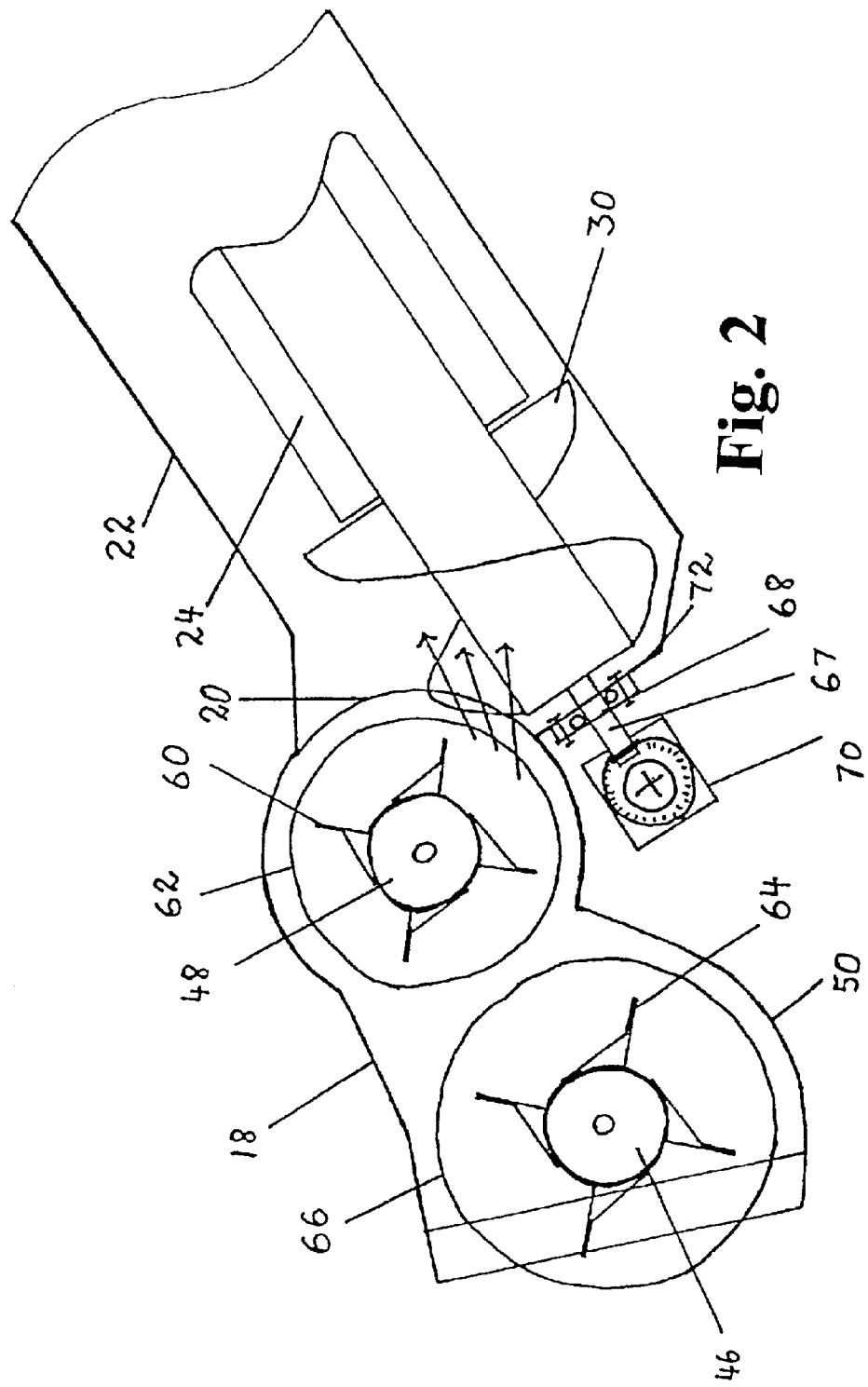
FIG. 2 is a partial schematic side view of an arrangement including a feeder housing, separation unit, and transition housing according to an embodiment of the present invention.

FIG. 2 illustrates the relative arrangement of the feeder housing 18, rotating elements 46, 48, and separation unit. The rotating element 48 is accommodated in the rear portion of the feeder house 18. The rotating element 48 is equipped with feeding bars 60, which can accommodate special tooling. Such tooling could be rasp bars for effecting a threshing action upon the harvested material fed by rotating element 48 or tools that only grab with a limited width into the mat of harvested crops so that the mat is pulled apart. This is particularly advantageous if the circumferential speed of the rear rotating element 48 is faster than that of rotating element 46. The position of the feeding bars 60 or the tools fixed on them, and, therefore, the overall circumference 62 of the rotating element 48, is adjustable in order to maintain a limited clearance between the circumference 62 of the rotating element 48 and the circumference of the auger blades 30. In a preferred embodiment, the clearance between the circumference 62 of the rotating element 48 and the auger blades 30 is no more than 15 centimeters and is as small as 1 centimeter. The front rotating element 46 is also equipped with feeding bars 64, which can be equipped with appropriate tooling. The circumference of the front rotating element 46 with tooling is represented by circle 66.

The separation rotor 24 has a front shaft 67 that is supported by a bearing 68. The shaft 67 projects into a gearbox 70, from which a drive shaft for powering other components is directed to the side of the combine 2. The bearing 68, and with it the front shaft 67, is supported by a back wall 72 connected with a floor section of the feeder housing 18. A gearbox or a generator can also be attached to the back wall 72.

Figure 3:
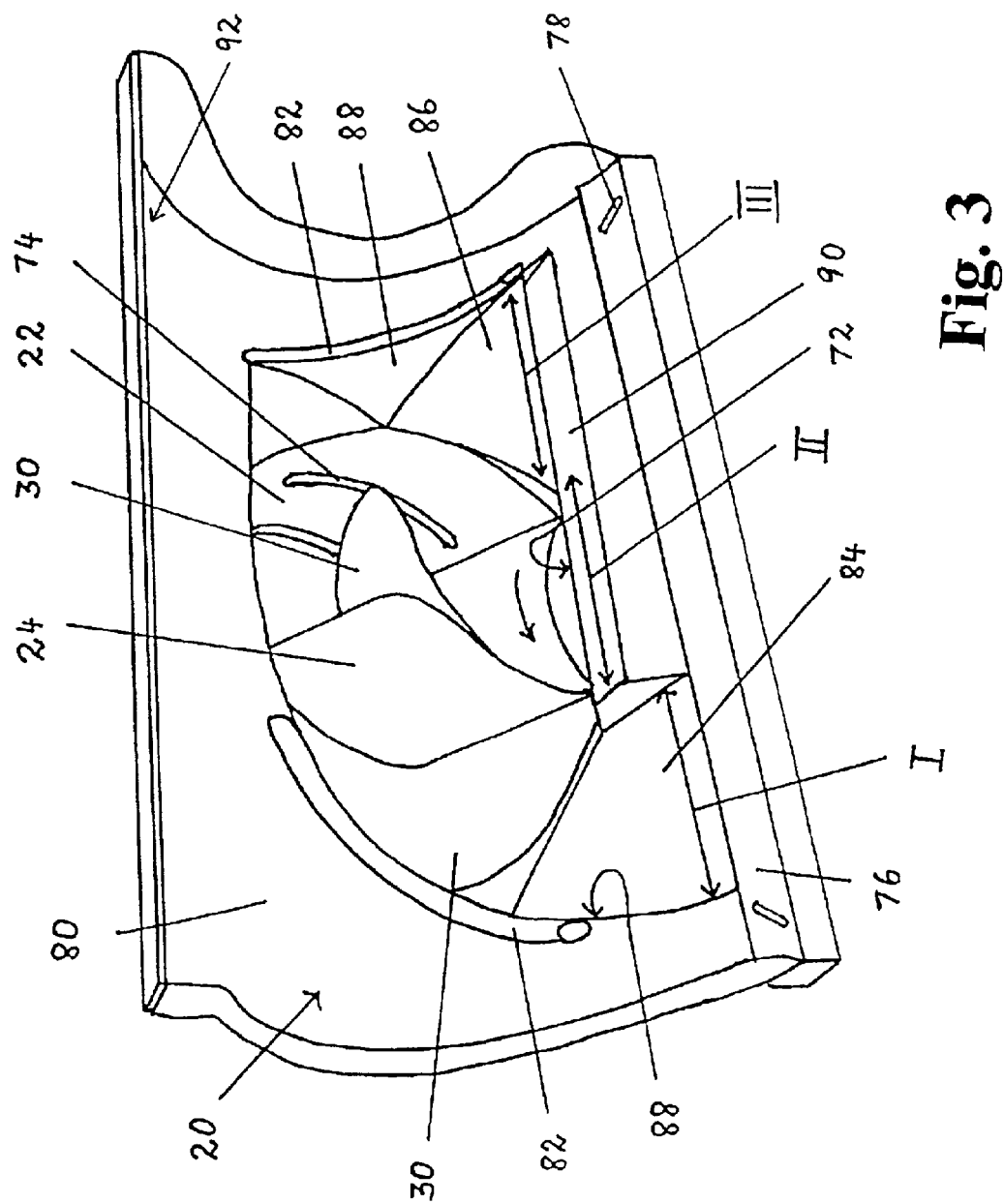
FIG. 3 is a perspective view of a transition housing according to an embodiment of the present invention.

FIG. 3 illustrates a transition housing 80 which connects the feeder housing 18 and the rotor housing 22. In this figure, the feeder housing 18 has been detached in order to present an unobstructed view. A plurality of interior edges 92 in the transition housing 80 form a feeding opening 20 in the transition housing 80 through which harvested crops are directed from the feeder housing 18 into the rotor housing 22. The feeding opening 20 is arranged in a plane above the separation rotor 24. In the embodiment shown in FIG. 3 the separation rotor 24 is equipped with two auger blades 30, but any number of auger blades may be used. The separation rotor 24 is surrounded by the rotor housing 22. Guiding rods 74 are attached to the inner surface of the rotor housing 22 and push the harvested material grabbed by the auger blades 30 rearwardly. Guiding rods 78 are also attached to a front bar 76, which is positioned between the feeder housing 18 and the transition housing 80. These guiding rods 78 guide the flow of harvested material toward the smaller width of the feeding opening 20 in relation to the full width of feeder house 18. In another embodiment, similar guiding rods are attached to the floor of the feeder housing 18 further towards the front of the combine harvester 2.

It is advantageous for the diameter of the auger blades 30 to be tapered towards the front, or feed end, of the separation unit. This arrangement allows the separation rotor 24 to reach down to a very low level while avoiding the danger that the front tips of the auger blades 30 might limit the ground clearance of the combine 2. It is also advantageous because the circumferential speed of the tips of the auger blades 30 is lower at the front end of the separation rotor 24 due to the reduced diameter, while increasing as the diameter of the auger blades 30 increases. The acceleration process is thereby stretched over a longer distance. The reduced circumferential speed at the feed end of the separation rotor 24 results in reduced kernel breakage. This arrangement also provides a tighter and more effective clearance between auger blades 30 and the rotating element 48.

The transition housing 80 has a curved form which partially encircles the rotating element 48. In alternate embodiments, the transition housing 80 may be constructed of one piece or from several different sections welded together or otherwise connected to achieve the structure shown structure. When viewed from the side, the transition housing 80 has a substantially planar surface around the feeding opening 20. The interior edges 92 of the transition housing 80 are arranged so that the feeding opening 20 is wider at the bottom than at the top.

The shape of the transition housing 80 and feeding opening 20 enhances the transfer of harvested material from the feeder housing 18 to the rotor housing 22 due to the wide mouth at the bottom of the feeding opening 20, which allows the majority of harvested material to be fed into the separation rotor 24. This is important because the harvested crops are fed underneath the rotating element 48 and, therefore, approach the feeding opening 20 close to the bottom floor of feeder housing 18. The harvested material is thrown into the feeding opening 20 by rotating element 48 with a tangential direction, resulting in most of the harvested good leaving the rotating element 48 with a direction as indicated by the group of three arrows shown in FIG. 2.

The harvested material that has not left the rotating element 48 in approximately the first third of the height of the feeding opening 20 tends to stay on the rotating element 48. This can be prevented by tapering the width of the feeding opening 20 towards its top region so that the harvested material that does stick on the rotating element 48 is forced to move in a lateral direction. This action helps separate the harvested material from the rotating element 48. The width of the feeding opening 20 is tapered on the side where the separation rotor 24 is travelling in a downward direction as it rotates. This arrangement directs the harvested material in a downward direction in that region where it is fed into the separation rotor 24. The arrangement also prevents clogging of the separation rotor 24. The tapering of the feeding opening 20 is accomplished by forming one of the interior edges of the transition housing in a long bow. On the opposite side, the separation rotor is moving upwards as it rotates and the harvested material is thrown far into the space of rotor housing 22, and, therefore, it is not necessary to taper the width of the feeding opening 20 on this side. This arrangement results in the feeding opening 20 being asymmetrical in shape. This asymmetric shape supports the required change of moving direction of the harvested material from a linear or tangential direction into a helical movement inside of the rotor housing 22, thereby enhancing the transfer of the harvested material into the rotor housing 22.

A rod 82 with a curved surface is arranged along at least one of the interior edges that form the feeding opening 20. The curved surface of the rod 82 reduces kernel breakage. In addition, the curved surface prevents individual straws from being cut in the event that they pass the rod with only a part of the straw being fed into the rotor housing 20 while the other part continues rotating with rotating element 48. The rod 82 is arranged in a location where harvested material should be combed off from the circumference of rotating element 48 and directed into the feeding opening 20. Rod 82 may project over the surface of the transition housing 80, in which case it serves to reduce the clearance between the circumference 62 of rotating element 48 and the surface of the transition housing 80 even further than already suggested.

FIG. 3 also shows different floors for feeding the harvested good into the rotor housing 22. Three floors (I, II and III) are shown in this particular embodiment but any number of floors may be used. While all three floors have approximately the same width, each floor has a different height level and shape from which it transfers harvest material into the rotor housing 22. In the illustrated embodiment, floor I directs the harvested material with plane 84 at a very low level into the rotor housing 22 on the side where the separation rotor 24 travels downward as it rotates. In other embodiments, the plane 84 of floor I can be positioned at the level of the rotor shaft or below. The medium floor II directs the harvested good directly upon the tube of the separation rotor 24. Floor III lifts the harvested good upward via plane 86. Plane 86 also extends further into the rotor housing 22, so that the harvested material is fed into the rotor housing 22 at a higher and more remote position. These multiple transfer locations around one revolution of the separation rotor 24 enhances the adjustment of the travel direction of the harvested material from a linear or tangential movement into a helical movement. The auger blades 30 also accept the harvested material from different points, resulting in additional crop being separated and more evenly distributed inside the rotor housing 22. In alternate embodiments, the transfer of harvested material is further enhanced by additional guiding planes 88, which push the harvested good laterally toward the rotor housing 22.

A bulge 90 is provided in the bottom of the transition housing 80. The bulge accommodates a shaft underneath the transition housing 80 that transmits power from the separation rotor 24 to rotating elements 46, 48, the cutterbar, or any other components, such as generators. The surface of the bulge 90 also lifts the harvested material up to the level on which the front of the shaft of the separation rotor 24 is located.

The basic structure of the feeding opening 20 with minor adaptations is also used in combines with two separation rotors 24 aligned side by side. In a combine in which both separation rotors 24 are rotating in the same direction, two of the feeding openings 20 are arranged side by side with an at least substantially similar design. In a combine in which the separation rotors 24 are rotating in different directions, the shape of one feeding opening 20 will substantially be a mirror image of the other separation rotor 24. Some small modifications are required in the region where the margins of the two feeding openings 20 approach each other. In one embodiment, the transition housing 80 is made very slim in that region. In an alternate embodiment, a rod is arranged in the region between both feeding openings 20 to divide the flow of harvested material into two streams directed to the two respective rotor housings 22.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. A combine harvester having a feeder housing, a thresher and a separation unit including a rotor driven by a shaft and arranged in a rotor housing, said thresher and separation unit having a feed end and a discharge end, means for mounting said thresher and separation unit at an angle of at least about 30° from a horizontal plane, and a transfer mechanism located in the region of the intersection of the feeder housing and the feed end of the thresher and the separation unit, the transfer mechanism including:
   a plurality of auger blades rotatably connected with the rotor at the feed end;
   a rotating element having feeding bars extending crosswise of the rotor, the rotating element having an axis of rotation perpendicular to the axis of the rotor and being located in the feeder housing and above the feed end of the rotor, and means for rotating the rotating element in a direction so that it feeds unthreshed harvested crops from underneath the rotating element's axis of rotation to above the axis of the rotor and onto the rotor;
   a transition housing connecting the feeder housing and the rotor housing and having a plurality of interior edges forming a feeding opening through the transition housing wherein the interior edge of the transition housing that forms the bottom of the feeding opening is longer than the interior edge that forms the top of the feeding opening, and wherein said transition housing projects up to the width of the feeder housing and has a concave bend to accommodate the circumference of the rotating element; and
   wherein the interior edge of the transition housing forming the bottom of the feeding opening is provided with at least three floors, each of said floors being at a different height.

2. A combine harvester according to claim 1, wherein the floors direct harvested crops into the separation unit at different height levels.

3. A combine harvester according to claim 1, wherein the diameter of the auger blades is tapered toward the feed end of the separation unit.

4. A combine harvester according to claim 1, wherein the clearance between the circumference of the rotating element and the circumference of the auger blades is less than 15 centimeters.

5. A combine harvester according to claim 1, further including a rod having a curved surface connected with at least one of the interior edges of the transition housing.

6. A combine harvester according to claim 1, further including a bulge in the bottom of the transition housing at the side of the transition housing where the rotor travels upwards as it rotates.

7. A combine harvester according to claim 1, wherein one of the floors is provided with a back wall and further including a bearing for the rotor connected with the back wall.

8. A combine harvester according to claim 7, further including a mechanical element driven by the rotor shaft, wherein the mechanical element is connected with the back wall.

9. A combine harvester according to claim 1, further including guiding rods connected with the bottom of the feeder housing.

10. A combine harvester according to claim 1, further including guiding rods connected with the bottom of the transition housing.

11. A combine harvester having a feeder housing, a thresher and separation unit including rotor driven by a shaft and arranged in a rotor housing, said thresher and separation unit having a feed end and a discharge end, means for mounting said thresher and separation unit at an angle of at least about 30° from a horizontal plane, and a transfer mechanism located in the region of the intersection of the feeder housing and the feed end of the thresher and separation unit, the transfer mechanism including:
   a plurality of auger blades rotatably connected with the rotor at the feed end;
   a rotating element having feeding bars extending crosswise of the rotor, the rotating element having an axis of rotation perpendicular to the axis of the rotor and being located in the feeder housing and above the feed end of the rotor, and means for rotating the rotating element in a direction so that it feeds unthreshed harvested crops from underneath the rotating element's axis of rotation to above the axis of the rotor and onto the rotor;
   a transition housing connecting the feeder housing and the rotor housing and having a plurality of interior edges forming a feeding opening through the transition housing wherein the interior edge of the transition housing that forms the bottom of the feeding opening is longer than the interior edge that forms the top of the feeding opening, and wherein said transition housing projects up to the width of the feeder housing and has a concave bend to accommodate the circumference of the rotating element; and
   wherein the interior edge of the transition housing forming one of the sides of the feeding opening is in the form of a long bow and is unsymmetrical in relation to the opposite interior edge.

12. A combine harvester having a feeder housing, a thresher and separation unit in including a rotor arranged in a rotor housing, said thresher and separation unit having a feed end and a discharge end, means for mounting said thresher and separation unit at relatively steep angle to a horizontal plane, and a transfer mechanism located in the region of the intersection of the feeder housing and the feed end of the thresher and separation unit, the transfer mechanism including:

a plurality of auger blades connected with the rotor at the feed end;

a rotating element having feeding bars and located in a rear portion of the feeder housing and having an axis of rotation that is coaxial with the rotational axis of the feeder housing and perpendicular to axis of the rotor and above the feed end of the rotor, wherein the rotating element feeds unthreshed harvested crops from underneath the rotating element's axis of rotation to above the axis of the rotor and onto the rotor;

a transition housing connecting the feeder housing and the rotor housing, said transition housing having a plurality of interior edges forming a feeding opening through the transition housing;

wherein the means for mounting the thresher and separation unit includes a back wall of the rotor housing which supports the feed end of the thresher and separation unit; and further including a rod having a curved surface connected with at least one of the interior edges of the transition housing.

13. A combine harvester according to claim 12, wherein the interior edge of the transition housing forming the bottom of the feeding opening is provided with a plurality of floors, each of said floors being at a different height.

14. A combine harvester according to claim 13, wherein the floors direct harvested crops into the separation unit at different height levels.

15. A combine harvester according to claim 12, wherein the interior edge of the transition housing forming one of the sides of the feeding opening is in the form of a long bow and is unsymmetrical in relation to the opposite interior edge.

16. A combine harvester according to claim 12, wherein the clearance between the circumference of the rotating element and the circumference of the auger blades is less than 15 centimeters.

17. A combine harvester according to claim 12, further including a bulge in the bottom of the transition housing at the side of the transition housing where the rotor travels upwards as it rotates.

18. A combine harvester according to claim 12, further including guiding rods operatively connected with the bottom of the feeder housing and the transition housing.

19. A transition cowling for a combine harvester having a thresher rotor with a non-level tapered crew auger and having a feeder on an axis substantially perpendicular to an axis of the threshing rotor, said cowling comprising;

a receiving margin adapted to receive crop from the feeder;

an output aperture having a lower floor at a level at least as high as a lower end of the tapered screw auger, a downward side edge continuous with said lower floor and tapered such that said output aperture is widest where said downward side edge meets said lower floor;

said output aperture further having an upper floor continuous with an untapered upward side edge, said upper floor being oriented relative to the tapered screw auger such that crop output by said upper floor is received by the tapered screw auger above the narrowest width of the tapered screw auger; and said output aperture having an intermediate floor laterally between said lower floor and said upper floor, said intermediate floor being higher than said lower floor and said intermediate floor being lower than said upper floor.

20. The cowling of claim 19 further comprising a guide plane in operative communication said upward side edge and oriented to bias output crop in a substantially lateral, medial direction.

21. The cowling of claim 19 wherein said receiving margin is concave.

22. The cowling of claim 19 wherein each of said floors is substantially flat.

23. The cowling of claim 19 wherein said floors are stepped.

24. The cowling of claim 19 further comprising a rod along a portion of said output aperture and disposed to be in close operative communication with an edge of a blade of the tapered screw auger.

25. The cowling of claim 24 wherein said rod is located substantially along said downward side edge.

26. The cowling of claim 19 further including a lateral bulge for accommodating a drive train shaft.

* * * * *